United States Patent Office
3,317,508
Patented May 2, 1967

3,317,508
PROCESS FOR MAKING ALKYLENE OXIDE-POLYOL ADDUCTS
Albert D. Winquist, Jr., St. Albans, and Louis F. Theiling, Jr., Charleston, W. Va., assignors to Union Carbide Corporation, a corporation of New York
No Drawing. Filed Nov. 9, 1964, Ser. No. 409,939
19 Claims. (Cl. 260—209)

This invention relates to the production of alkylene adducts of hydroxylated organic compounds. More particularly, this invention relates to the utilization of di-tertiary amino compounds as catalysts in the production of alkylene oxide adducts of polyhydroxylated organic compounds.

Heretofore, the production of alkylene oxide adducts of hydroxylated organic compounds has been effected by utilizing as catalysts for the reaction, alkali metal hydroxides (such as potassium hydroxide, sodium hydroxide, and the like), amines such as trialkyl amines, e.g., trimethyl amine, and quaternary ammonium compounds such as benzyltrimethyl ammonium hydroxide. The use of these catalysts results in one or more difficulties which the art has sought to avoid. For example, the alkali metal hydroxides such as NaOH and KOH tend to favor the formation of terminal unsaturation in the adduct, create reactant decomposition products during the making of the adducts and require expensive catalyst removal procedures since the presence of such catalyst residue deleteriously affects the adduct. The trialkylamines appear to operate more favorably with specific types of polyhydroxy organic compounds such as sucrose, pentaerythritol, sorbitol, glycerol, and the like compounds, but however, are gaseous at the operating temperatures and therefore require critical control of pressure conditions during the reaction; are difficult to handle and require the utilization of expensive equipment in order to insure optimum and accurate incorporation in the reaction medium. In addition, it has been taught in the literature that triethylamine is a very specific catalyst insofar as its advantage appears to reside in the addition of only one alkylene oxide moiety per each hydroxyl group contained in the polyhydroxy organic compound. In the case of trialkylamines, the literature suggests limiting the use of such amines to very specific classes of organic polyhydroxy compounds and alkylene oxides.

This invention relates to the utilization of novel di-tertiary amino (and/or quaternary ammonium derivatives) catalysts for the formation of alkylene oxide adducts of polyhydroxy organic compounds. The catalysts of this invention have unusual versatility in that they are useable with a wide variety of alkylene oxide and polyhydroxyorganic reagents; can be utilized in relatively low temperature reactions thus precluding the formation of unwanted by-products and decomposition products; can be left in the reaction product without adversely affecting the product; are typically liquid or solid at the temperature at which the reagents are usually charged to the reactor and therefore is easily handled; allow reaction in relatively simple and low cost equipment; can be readily provided in the reaction medium in very specific quantities and are easily so provided because of their liquid or solid state; provide attractive yields and reaction rates and thus are suitable for commercial utilization.

Most advantageously, these di-tertiary diamino compounds or their quaternary ammonium derivatives are most advantageously utilized to catalyze the reaction between alkylene oxide and a polyhydroxylated organic compound which on or about its melting point or decomposition temperature creates undesirable color in the reaction product. The catalysts of this invention allow interreaction of such a compound with the alkylene oxide at temperatures of at least about 20° C. below its melting point or decomposition temperature. Illustrative of such a polyhydroxylated compound is sucrose which when reacted with an alkylene oxide on or about its decomposition temperature results in a black or highly colored mass which is unsuitable for commercial utilization. However, the di-tertiary diamino compounds of this invention can be utilized for the reaction of sucrose with alkylene oxide at temperatures sufficiently low enough to preclude unwanted coloration of the reaction product.

Another feature of the process of this invention resides in the fact that the di-tertiary diamino catalysts of this invention, as well as their quaternary ammonium derivatives, allow complete reaction of the alkylene oxide with all of the hydroxyl groups of the polyhydroxylated organic compound.

The process of this invention is carried out by forming a mixture of alkylene oxide and a polyhydroxylated organic compound and providing in the mixture an amount of di-tertiary diamino compound sufficient to effect addition between the alkylene oxide and the polyhydroxylated organic compound. The compounds suitable as the catalyst in the process of this invention may be characterized by the following formula:

I

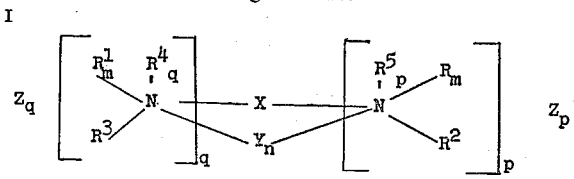

wherein X may be one of alkylene of from about 2 to 10 carbon atoms, arylene containing 1 or 2 rings therein, alkylenearylalkyl, arylenealkylaryl, and the like; Y is alkylene of from about 2 to about 10 carbon atoms; R, $R^1$, $R^2$, $R^3$, $R^4$ and $R^5$ are each one of alkyl having from 1 to about 12 carbon atoms, phenyl, alkylphenyls wherein the alkyl group has from about 1 to about 12 carbon atoms, phenylalkyl wherein the alkyl group has from 1 to about 8 carbon atoms, and the like; $n$ is 0 when X is other than alkylene and may be 1 when X is alkylene; $m$ is 0 when $n$ is 1 and is 1 when $n$ is 0; $q$ and $p$ may be one of 0 and 1; and Z is one of —OH, halide (e.g., chloride, bromide, iodide, etc.), carboxylate such as formate and alkyl carboxylates wherein the alkyl group has from 1 to about 8 carbon atoms.

Particularly preferred compounds encompassed by Formula I are the di-tertiarydiamino compounds characterized by the following formula:

II

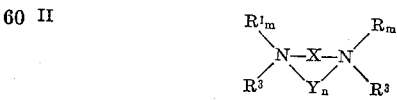

wherein R, $R^1$, $R^2$, $R^3$, X, Y, $m$ and $n$ are defined above.

Illustrative of the compounds characterized by the above formulae, include, by way of example, the following: N,N,N',N'-tetramethyl ethylene diamine, N,N,N',N'-tetramethyl butylene diamine, N,N,N',N'-tetraethyl hexamethylene diamine, N,N,N',N'-tetrabutyl octamethylene diamine, N,N,N',N'-tetraisopropyl-2-ethylhexamethylene diamine, N,N'-diphenyl-N,N'-dimethyl ethylene diamine, N,N,N',N'-tetrabenzyl ethylene diamine, N,N'-di-n-nonyl-N,N', diisobutyl butylene diamine, N,N,N',N'-tetraphenyl ethylene diamine, 1,2,4-trimethyl piperazine, 1,2,4,5-tetramethyl piperazine, 1,4-dihexyl piperazine, 1,4-bis-[(N-dimethyl) aminopentyl] piperazine, 1,4-bis[(N-dimethyl)aminomethyl]piperazine, N,N,N',N'-tetramethyl-1,4-phenylene diamine, N,N'-dimethyl-N,N'-diethyl-1,4-phenylene diamine, N,N-diphenyl-N',N'-dimethyl-1,3-phenylene diamine, N,N,N',N'-tetramethyl - 1,4 - di(aminomethyl)benzene, N,N,N',N'-tetramethyl-1,4-di(aminohexyl)benzene, 2-bis-[(N,N,N',N'-tetramethyl)-1,4-diaminophenyl]propane, 2-bis-[(N,N' - dibenzyl - N,N' - diethyl) - 1,4 - diaminophenyl] propane, bis-[(N,N,N',N'-tetraphenyl)-1,4-diaminophenyl]methane.

The quaternary ammonium derivatives of the above di-tertiary diamines may be formed by procedures well known such as reacting di-tertiary diamines with hydrocarbyl halide (e.g., R⁴E wherein E is halide such as chloride, bromide and iodide). The di-tertiary diamines may be monoquaternerized or diquaternized depending on the molar concentration of the halide. The resulting quaternary halide may be converted to the corresponding hydroxide by reaction with silver hydroxide, alkali metal hydroxides (e.g., NaOH, KOH, CeOH, etc.) and the hydroxide may be converted to the carboxylate by reaction with the carboxylic acid such as formic acid, acetic acid, phenylacetic acid, or their acid halide derivatives and the like.

The process of this invention involves the addition of the aforedefined di-tertiarydiamine compounds or their quaternary ammonium derivatives to induce the addition reaction between the alkylene oxide and hydroxylated organic compound. This catalytic process involves the addition reaction of a variety of alkylene oxides with a broad class of hydroxylated organic compounds. All that is necessary to meet the terms of this invention is that the alkylene oxide possess the oxirane radical directly bonded to carbon atoms free of ethylenic unsaturation formed with carbon atoms of the oxirane radical. Preferably, the oxirane radical is bonded to a saturated aliphatic moiety of the alkylene oxide compound and, most desirably, such moiety is acyclic.

Illustrative of suitable alkylene oxides in the practice of this invention, include, for example, the following: ethylene oxide, 1,2-propylene oxide, 1,2-butylene oxide, 1,2-hexylene oxide, 1,2-dodecylene oxide, cyclohexylethylene oxide, styrene oxide, and the like alkylene oxides. The particularly preferred alkylene oxide in the process of this invention is 1,2-propylene oxide, used alone or in combination with ethylene oxide. Most favorable results are exhibited from the use of such preferred alkylene oxides.

The hydroxylated organic compounds to which the alkylene oxides are added in accordance with the process of this invention include essentially any organic compound possessing a hydroxyl group directly bonded to non-oxo containing carbon of the organic compound. Preferably, the compound is a polyhydroxylated organic compound, and therefore, possesses at least 2 hydroxyl groups. As indicated above, the process of this invention is most suitably employed with polyhydroxylated organic compounds which form undesirable coloration when reacted with alkylene oxides in accordance with prior art processes at or about its melting point or decomposition temperature. Even though the process of this invention is significantly desirable with this specific class of polyhydroxylated organic compounds, it has broad applicability to the general class of polyhydroxylated organic compounds and illustrative of the broad general class are, e.g., 1,2-alkylene glycol, 1,3-alkylene glycol, 1,4-alkylene glycol, alkylene triols, alkylene tetrols, alkylene pentols, alkylene hexols, polyalkylene glycols, etc. Illustrative of these materials include, ethylene glycol, 1,2- and 1,3-dihydroxy propane, 1,2-, 1,3-, 1,4-dihydroxy pentane, 1,2-, 1,3-, 1,4-dihydroxy hexane, 1,2-, 1,3-, 1,4-dihydroxy decane, 1,2-, 1,3-, 1,4-dihydroxy octadecane; and the alpha, omega diols of the above hydrocarbon moieties not indicated as such; poly-alkyleneoxy glycols such as diethylene glycol, triethylene glycol, tetraethylene glycol, 1,2- and 1,3-dipropylene glycol 1,2- and 1,3-tripropylene glycol, 1,2-, 1,3- and 1,4-dibutylene glycol, 1,2-, 1,3- and 1,4-tributylene glycol, etc; triols which may be utilized are illustrated by glycerol, 1,1,1-trimethylolpropane, 1,2,3-trihydroxy butane, 1,2,3-trihydroxypentane, 1,2,3-trihydroxyoctane, 1,2,3-trihydroxy decane, 1,2,4-trihydroxy butane, 1,2,4-trihydroxyhexane, 1,2,6-trihydroxy hexane, 1,2,8-trihydroxy octane, and the like. Illustrative of other polyhydroxylated organic compounds which are suitably employed herein include, sorbitol, pentaetrythritol, erythritol, aromatic hydroxy compounds of the formulae:

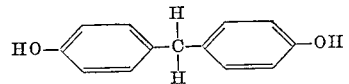

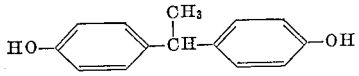

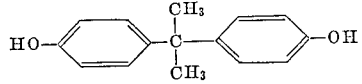

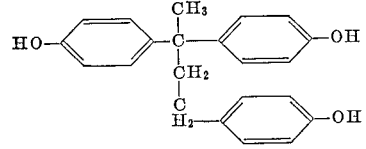

and the like, and the saturated (non-benzenoid) derivatives thereof; various carbohydrates such as the monosaccharides and polysaccharides, e.g., cellulose; starch; glucosides, such as the lower alkyl (1 to 6 carbon atoms) glucosides, e.g., methyl-D-arabinoside, methyl-D-xyloside, ethyl-D-xyloside, n-butyl-D-riboside, methyl, ethyl, propyl, butyl, and 2-ethylhexyl-D-glycoside, 2-ethylhexyl-D-fructoside, isobutyl-D-mannoside, ethyl-D-galactoside, benzyl-D-glycoside and methyl-L-rhammoside; sucrose; glycose glycoside; maltose; lactose; D-gulose, D-idose, hydroxylethyl cellulose; amylose; amylopectin; dextrin; and the like.

In addition to the polyhydroxylated organic compounds described above, there may also be included hydroxylated amino compounds, preferably amino compounds wherein all nitrogen is tertiary nitrogen, such as trialkanol amines, such as: triethanolamine, triisopropanolamine, tributanolamines; the alkylene oxide adducts of various other amines such as the ethylene oxide and/or 1,2-propylene oxide adducts of such amines as methylamine, ethylamine, isopropylamine, butylamine, benzylamine, aniline, the toluidines, naphthylamines, ethylenediamine, diethylenetriamine, triethylenetetramine, 1,3-butanediamine, 1,3-propanediamine, 1,4-butanediamine, 1,2-, 1,3-, 1,4-, 1,5- and 1,6-hexanediamine, phenylenediamines, toluenediamines, xylenediamines, naphthalenediamines, and the like.

Other hydroxylated amino compounds, which are of particular interest include, e.g., N,N,N',N'-tetrakis(2-hydroxyethyl)ethylenediamine, N,N,N',N'-tetrakis(2-hydroxypropyl)ethylenediamine, N,N,N',N'',N''-pentakis-(2-hydroxypropyl)diethylenetriamine, phenyldiisopropanolamine and higher alkylene oxide adducts of aniline, the alkylene oxide adducts of aniline or substituted-aniline/formaldehyde condensation products; alkylene oxide adducts of aromatic amine/phenol/aldehyde ternary condensation products which are prepared by condensing and aromatic amines, for instance aniline, toluidine, or the like, a phenol such as phenol, cresol, or the like, and an aldehyde preferably formaldehyde, at elevated temperatures in the range of, for example, from 60° C. to 180° C., after which the condensation product is then recovered and reacted with alkylene oxide to produce the polyols, and of such products, the propylene oxide and mixed propylene-ethylene oxide adducts of aniline/phenol/formaldehyde ternary condensation products deserve particular mention; alkylene oxide adducts of phosphorus and polyphosphorus acids which may be formed by reacting ethylene oxide, 1,2-epoxypropane, the epoxybutanes, 3-chloro-1,2-epoxypropane, and the like, with phosphoric acid, phosphorous acid, the polyphosphoric acids such as tripolyphosphoric acid, and the like, or phosphites such as tris(dipropylene glycol) phosphite and the phosphonates which can be produced therefrom by heating in the presence of, e.g., butyl bromide; and alkylene oxide adducts of castor oil.

The reaction between the alkylene oxide and the hydroxylated organic compound using the catalysts of this invention involves simply intermixture of the afore-mentioned components. Preferably, the invention is effected in a liquid medium containing hydroxylated organic compound, alkylene oxide with the optional presence of an inert solvent or liquid suspending medium. The reaction may be carried out by the incremental addition of alkylene oxide to hydroxylated organic compound or by incremental addition of the hydroxylated organic compound to alkylene oxide; most desirably, the alkylene oxide is incrementally added to the hydroxylated organic compound. The reaction may be effected over a broad temperature range, but most desirably at a temperature between about 60° C. and about 160° C. The reaction may be effected at atmospheric pressure to pressures as high as 200 pounds per square inch gauge, and preferably, from about 5 to about 100 pounds per square inch gauge. The atmosphere over the reaction is not normally critical. However, if one of the reactants is gaseous at operating temperature, it is desirable to maintain this reactant as either the sole atmosphere above the reaction or provide that any gas above the reaction is inert to the reagents and resulting adducts at operating conditions. Usable inert gases include nitrogen, argon, methane, carbon dioxide, carbon monoxide, and the like.

Solvents which are suitably employable to either act to effect solution of the reagents or to effect solution of only one reagent and suspension of any others, include such inert solvents as, for example, xylene, toluene, benzene, naphthalene, mineral spirits, hexane, heptane, octane, nonane, dodecane, cyclohexane, chloromethane, methylene chloride, chloroform, carbontetrachloride, chloroethane, 1,2-dichloroethane, methylchloroform, 1,1, 2-trichloroethane, perchloroethane, perchloroethylene, 1-fluoro-1,2-dichloroethane, 1,2-difluoroethane, 1-fluoro-1, 2,2-trichloroethane, methylethylketone, methylbutylketone, ethylisobutylketone, 5-oxo-nonane, methylpentylketone, cyclohexanone, 4-methylcyclohexanone, 3-methylcyclohexanone, dimethylformamide, dimethylacetamide, N-methyl-2-pyrrolidone, and the like.

When using some of the lower boiling solvents or suspending mediums described above, there may occur at the reaction temperature considerable pressure build-up and therefore, in such cases, one should utilize high pressure resistant equipment or lower temperatures of reaction or smaller quantities of the solvent or suspending mentioned alkylene oxides and sucrose. Such advantages as ease of handling because the catalysts are liquid or solid at the reaction temperatures, is joined by the high effectiveness of these novel catalysts in inducing adduct formation. The physical condition of such catalysts at reaction temperature provides simple and better control of the amount of such catalyst in the reaction system than is the case with catalysts taught by the prior art. In addition, the catalyst of this invention allows one to utilize reaction temperatures which are at least 20° C. lower than the temperatures at which sucrose starts to decompose and preferably utilizes temperatures ranging from about 95° to 120° C., preferably between about 100° C. and about 115° C. The amount of catalyst utilized to effect this reaction is the same amount weight of the alkylene oxide to the milliequivalent weight of the hydroxylated organic compound. However, if one desires, less than a stoichiometric amount of alkylene oxide may be employed and therefore less than all of the hydroxyl groups of the polyhydroxylated organic compound may be reacted with the alkylene oxide. In such case, one can also readily predict the average molecular weight of the reaction product, from which the total weight of the reaction product is readily determinable. In the preferred operation of this invention, the amount of the catalyst employed is in the range of from about .1 to about 1 weight percent, basis weight of the reaction product.

As indicated previously, the process of this invention is most favorably employed when the hydroxylated organic compound, upon reaction in accordance with prior art techniques at or about its melting point or decomposition temperature, forms a product having unwanted coloration. The catalyst of this invention allows the production of such adducts at temperatures at least 20° C. below such melting point or decomposition temperature and therefore minimizes the coloration problem.

Of particular concern is the reaction of alkylene oxides with sucrose and in the most specific case, the reaction of propylene oxide or a combination of propylene oxide and ethylene oxide with sucrose. As indicated previously, sucrose readily forms a highly discolored adduct with such alkylene oxides when the reaction proceeds at about the decomposition temperature of sucrose. This problem is recognized in the art and the art has recommended the use of amines such as trimethylamines and quaternary ammonium compounds to avoid the problem. Such amine and ammonium compounds appear to allow the reaction between the alkylene oxide and sucrose at considerably lower temperatures but such compounds are very difficult to handle in the particular process under consideration. For example, at the process temperature and, for that fact, at room temperature, trimethylamine is gaseous and its addition to the reaction mixture is chancey and hard to control. Other disadvantages from the use of trimethylamine have been discussed previously and are applicable in the specific case under consideration.

Triethylamine has also been suggested, and as mentioned before, it is taught by the art to produce very specific compounds and, therefore, its employment is limited to those specific compounds. As a rule, even triethylamines are gaseous under the reaction conditions, particularly when fed incrementally. The quaternary ammonium compounds must be provided in the reaction mixture in solution form wherein it is first dissolved in water or alcohols. In such cases, water and alcohols are competitive reactants for alkylene oxide to produce low molecular weight diols and mono-ols and therefore limit the range of products producible. Such mono-ols and diols directly compete with succrose and form unwanted mixtures of alkylene oxide adducts.

All of these disadvantages may be materially minimized, if not wholly avoided, by use of the catalysts of this invention to effect aduct formation between the aforementioned or longer incremental addition of one of the reagents, and the like techniques. However, in such cases where the alkylene oxide and the polyhydroxylated organic compounds are liquid or solid at reaction temperatures, such problem is not necessarily serious and the conventional techniques employed in such addition reactions may be used.

The catalyst may be provided in the reaction in amounts over a broad range. However, it has been found desirable to maintain the catalyst in the reaction mixture in amounts of from about .05 to about 2 weight percent of the weight of products obtained from the reaction. This is readily determinable in advance since the reaction utilizing the catalysts of this invention is at least stoichiometric with respect to the milliequivalent discussed previously and the pressure employed during the reaction may be those described previously.

A particularly desirable embodiment of this invention resides in effecting the instant process by a slurry technique in which the sucrose in solid particulate condition is slurried in a liquid other than the catalyst. For example, it has been found that most desirably effective reactions are obtained by slurrying sucrose in such inert liquids as inert hydrocarbons e.g., benzene, toluene, xylene, naphthalene, hexane, octane, nonane, cyclohexane and the like aliphatic and aromatic hydrocarbons; mixtures of the above hydrocarbons with chlorinated and fluorinated hydrocarbons such as described previously with respect to solvents and suspending mediums, and the like liquids. In addition, there may be employed liquid sucrose-alkylene oxide adducts or liquid alkylene oxide per se as a suspending or slurry medium for sucrose. These liquid adducts may be obtained from the process of this invention. It has been found that such a slurry technique is particularly desirable because it is possible to obtain relatively rapid reaction rates, desirable yields, and an easily handled reaction system. Other advantages will be apparent to those skilled in this art.

The particularly preferred manner in which the process is carried out involves the aforementioned slurry technique in which the sucrose is suspended in the liquid suspending medium to which is afterwards incrementally added the alkylene oxide. It is preferred to add propylene oxide alone, in admixture with ethylene oxide, or by separate and staged additions of each oxide.

The amount of suspending medium is not critical to this invention and amounts equivalent in weight of the sucrose to 100 times the weight of sucrose may be employed. In the case where there is utilized aromatic hydrocarbons as the suspending medium, it has been found preferable that of the reaction charge at least 60 percent by weight be the suspending medium when the sucrose is in powder or highly pulverized form, e.g., powdered sugar. However, in the case where granulated sugar is employed, lesser amounts of the suspending agents are required.

In addition to the above, it has been noted that when aromatic hydrocarbons are employed as the suspending medium and exceed 40 weight percent of the charge that the minimum amount of catalyst that one should employ is about .3 weight percent.

In some cases water may be employed at the beginning of the reaction to effect solution of the sucrose. In such cases, it has been noted that the reaction product contains appreciable amounts of alkylene oxide diol and there is not an essentially complete reaction of the alkylene oxide with sucrose. However, such may be minimized by removing water from the reaction medium once a quantity of alkylene oxide has been added sufficient to form a liquid sucrose adduct, which then acts as a suspending agent for the complete conversion of sucrose to the desired adduct. One of the advantages of the catalyst of this invention is the fact that during water stripping, catalyst retention is achieved and further catalyst additions are unnecessary. This is an appreciable advantage over processes where highly volatile amine catalysts are employed.

Further to the technique in which the suspending medium is the adduct of alkylene oxide and sucrose, the adduct also may be produced by starting with a hydrocarbon suspending medium. Once a liquid adduct is formed, the hydrocarbon may be stripped from the reaction zone.

The amount of suspending medium to the amount of reagent is not critical and extremely large quantities are useable. All that is necessary is to utilize enough of suspending medium to effect a reasonable dispersion of some of the sucrose particles.

In the case where the alkylene oxide acts as a liquid medium for sucrose, it is desirable to maintain the temperature of the reaction low enough so that the alkylene oxide is maintained in essentially liquid condition. For example, when using ethylene oxide, reasonably high pressures, such as pressures in excess of 30 pounds per square inch gauge, should be employed. In this particular process technique, the alkylene oxide serves not only as a suspending medium, but also as a reagent in adduct formation. Therefore, it is desirable to supply sufficient alkylene oxide to also produce the particular sucrose adduct desired.

The reaction can be controlled by variations in pressure and temperature and can easily be stopped by cutting off pressure and temperature. Simple analysis and viscosity measurements readily determine the nature of the adduct at any particular stage of the reaction.

This process may be carried out by a one-stage reaction where all of the components are introduced together in the suspending medium and the reaction is carried to completion, or a two-stage reaction wherein the sucrose is initially suspended in liquid hydrocarbons or alkylene oxide or dissolved in water. In the case of suspension in hydrocarbon and dissolution in water, when a liquid adduct is formed, the hydrocarbon and water are removed from the reaction (typically by distillation under reduced pressure) and the resulting liquid adduct acts as a suspending medium throughout the remainder of the reaction. The two-stage reaction may also be employed in the case where alkylene oxide is the suspending medium by employing less than the desired amount of alkylene oxide for final product formation and forming a liquid adduct and thereafter using such liquid adduct as a suspending medium for residual sucrose or solid adduct present and incrementally adding additional alkylene oxide.

The following examples specifically illustrate embodiments of this invention, but however, should not be considered as limiting the scope of this invention as defined above.

*Example 1*

A pressure reactor was charged with 9,000 grams of toluene (60 percent of charge), 6,000 grams of powdered sugar (6X grade without starch) and 46 grams N,N,N′,N″-tetramethylbutane-diamine while stirring continuously. It was then closed, flushed with nitrogen and heated to 110° C. Propylene oxide (9,462 grams) was then fed into the reactor at such a rate as to maintain a maximum pressure of 60 pounds per square inch gauge. A period of 7 to 8 hours was required for the oxide addition, followed by a 6 hour cook-out to insure reaction of the oxide with the sucrose. The product, after stripping off toluene, was a sirupy liquid having an hydroxyl number of 532 and a viscosity of 803 centistokes at 210° F.

*Example 2*

A pressure reactor was charged with 4,140 grams of toluene (40 percent of charge), 6,200 grams of powdered sugar (6X grade without starch) and 30 grams N,N,N′,N′-tetramethylbutanediamine while stirring continuously.

It was then closed, flushed with nitrogen and heated to 110° C. Propylene oxide (8,798 grams) was then fed into the reactor at such a rate as to maintain a maximum pressure of 60 pounds per square inch gauge. The feed required 9 hours to complete, followed by a 4 hour cookout to insure reaction of the oxide with the sucrose. The product, after stripping off toluene, was a sirupy liquid having an hydroxyl number of 527 and a viscosity of 745 centistokes at 210° F.

*Examples 3 through 18*

The procedures described in Example 1 were employed in the following examples, the important data of which are cited below.

| Example No. | Reactants | | Feed Time, Hrs. | TMBDA,* percent | | Unreacted Prop. Oxide, percent in— | | Polyol Properties | | | |
|---|---|---|---|---|---|---|---|---|---|---|---|
| | Sugar, Gms. | Prop. Oxide, cc. | | Chged.[a] | In Prod. | Toluene Layer | Polyol | OH No. | | Visc., CKS/ 210° F. | Color Gardner |
| | | | | | | | | Theoretical[b] | Obtained | | |
| 3 [c] | 6,000 | 10,900 | [e] 7 | 0.3 | 0.25 | 5.5 | 2.8 | 524 | 528 | 764 | 6½ |
| 4 | 6,000 | 10,900 | 7 | 0.3 | 0.26 | 5.2 | 2.6 | 524 | 533 | 837 | 6½ |
| 5 | 6,000 | 10,200 | 7 | 0.3 | 0.23 | 4.2 | 1.9 | 545 | 545 | 945 | 8 |
| 6 | 6,000 | 11,400 | 7½ | 0.3 | 0.22 | 5.8 | 2.9 | 509 | 532 | 803 | 6 |
| 7 | 6,000 | 11,600 | 7 | 0.3 | 0.23 | 5.7 | 2.8 | 504 | 527 | 794 | 6 |
| 8 | 6,000 | 10,750 | 7¼ | 0.3 | 0.24 | 6.9 | 3.5 | 528 | 528 | 749 | 6½ |
| 9 | 6,000 | 12,050 | 4 | 0.3 | 0.27 | 6.2 | 3.3 | 492 | 520 | 735 | 6 |
| 10 [d] | 6,000 | 11,400 | 8 | 0.3 | 0.31 | 6.2 | | 509 | 520 | 670 | 6½ |
| 11 | 6,000 | 11,400 | 7 | 0.3 | 0.21 | 5.1 | 2.7 | 509 | 527 | 793 | 7 |
| 12 | 6,000 | 12,150 | 4 | 0.3 | 0.23 | 5.5 | 2.7 | 490 | 527 | 717 | 7 |
| 13 | 6,000 | 13,400 | 8 | 0.3 | 0.30 | 7.5 | | 460 | 510 | 623 | 6½ |
| 14 | 6,000 | 13,400 | 9½ | 0.3 | 0.29 | 6.9 | | 460 | 504 | 599 | 9½ |
| 15 | 6,000 | 11,400 | 7½ | 0.3 | 0.19 | 5.9 | | 509 | 533 | 810 | 7½ |
| 16 | 6,000 | 11,400 | 7¾ | 0.3 | 0.20 | 5.4 | | 509 | 523 | 792 | 9 |
| 17 | 6,000 | 11,400 | 7 | 0.3 | 0.23 | 5.5 | | 509 | 520 | 744 | 8½ |
| 18 | 6,000 | 11,400 | 7 | 0.3 | 0.23 | 5.4 | | 509 | 521 | 787 | 9 |

[a] Based on sugar and propylene oxide used.
[b] If all propylene oxide reacted with sugar charged.
[c] Examples 3 to 9 cooked-out 6–8 hours to constant pressure.
[d] Examples 10 to 18 cooked-out 8 hours while pressure of 60 p.s.i.g. maintained with nitrogen.
[e] Reaction conditions used; 60% toluene-40% 6X sugar without starch 110° C./60 p.s.i.
*N,N,N′,N′-tetramethylbutanediamine.

*Examples 19 through 22*

The procedures described in Example 1 were employed in the following examples, the important data of which are cited below.

| Cook-Out, Hrs. | Example No. | | | | | | | |
|---|---|---|---|---|---|---|---|---|
| | 19 [a] | | | | 20 [a] | | | |
| | Prop. Oxide in Toluene Layer, Percent | OH No. | Visc., CKS at 210° F. | Color Gardner | Prop. Oxide in Toluene Layer, Percent | OH No. | Visc., CKS at 210° F. | Color Gardner |
| 1 | 9.4 | 519 | 745 | | 7.3 | 508 | 652 | |
| 2 | 8.8 | 513 | 684 | | 7.5 | 508 | 633 | |
| 3 | 7.7 | 509 | 687 | | 6.9 | 508 | 630 | |
| 4 | 8.5 | 512 | 657 | | 7.6 | 505 | 602 | |
| 5 | 7.5 | 509 | 652 | | 7.2 | 508 | 624 | |
| 6 | 7.4 | 508 | 643 | | 7.3 | 507 | 615 | |
| 7 | 7.8 | 510 | 646 | | | 504 | 615 | |
| 8 | 7.5 | 510 | 623 | 6½ | 6.9 | 504 | 579 | 9½ |

| Cook-Out, Hrs. | Example No. | | | | | | | |
|---|---|---|---|---|---|---|---|---|
| | 21 [b] | | | | 22 [b] | | | |
| | Prop. Oxide in Toluene Layer, Percent | OH No. | Visc., CKS at 210° F. | Color Gardner | Prop. Oxide in Toluene Layer, Percent | OH No. | Visc., CKS at 210° F. | Color Gardner |
| 1 | 10.4 | 560 | 1,327 | | 9.3 | 551 | 1,247 | |
| 2 | 9.7 | 551 | 1,167 | | 8.2 | 541 | 1,012 | |
| 3 | 7.4 | 537 | 932 | | 7.4 | 532 | 924 | |
| 4 | 6.1 | 531 | 858 | | 6.3 | 533 | 881 | |
| 5 | 6.2 | 526 | 799 | | 6.0 | 529 | 821 | |
| 6 | 6.1 | 528 | 820 | | 5.5 | | 844 | |
| 7 | 6.6 | 527 | 836 | | 5.6 | 527 | 821 | |
| 8 | 5.9 | 533 | 810 | 7½ | 5.4 | 523 | 792 | 9 |

[a] Sufficient propylene oxide added to theoretically obtain OH No.=460.
[b] Sufficient propylene oxide added to theoretically obtain OH No.=509.
Reaction conditions used: 60% toluene—40% 6X sugar without starch, 0.3% TMBDA*, 110° C./60 p.s.i.g., cooked out for 8 hours while maintaining pressure of 60 p.s.i.g. with nitrogen.
*N, N, N′,N′-tetramethylbutanediamine.

Examples 23 and 24

The procedures described in Example 1 were employed in the following examples, the important data of which are cited below.

| Cook-Out, Hrs. | Example 23 | | | | Example 24 | | | |
|---|---|---|---|---|---|---|---|---|
| | Prop. Oxide in Toluene Layer, percent | OH No. | Visc., CKS at 210° F. | Color Gardner | Prop. Oxide in Toluene Layer, percent | OH No. | Visc., CKS at 210° F. | Color Gardner |
| 2 | 7.3 | -------- | -------- | -------- | 9.3 | -------- | -------- | -------- |
| 4 | 5.9 | -------- | -------- | -------- | 6.1 | -------- | -------- | -------- |
| 6 | 5.7 | -------- | -------- | -------- | 6.0 | -------- | -------- | -------- |
| 8 | 5.5 | 520 | 744 | 8½ | 5.4 | 521 | 787 | 9 |
| 9 | 5.4 | -------- | -------- | -------- | 5.6 | -------- | -------- | -------- |
| 10 | 5.5 | -------- | -------- | -------- | 5.3 | -------- | -------- | -------- |
| 11 | 5.5 | -------- | -------- | -------- | 5.2 | -------- | -------- | -------- |
| 12 | 5.8 | -------- | -------- | -------- | 5.2 | -------- | -------- | -------- |
| 13 | -------- | -------- | -------- | -------- | 5.3 | -------- | -------- | -------- |
| 14 | 5.3 | 521 | 755 | 7½ | 5.0 | 520 | 756 | 8½ |

Reaction conditions used: 60% toluene—40% 6X sugar without starch, 0.3% TMBDA, 110° C./60 p.s.i.g., cooked out for 14 hrs. while maintaining pressure of 60 p.s.i.g. with nitrogen.

Example 25

A pressure reactor was charged with 6,720 grams toluene (60 percent of charge), 4,480 grams of 6X sugar without starch and 32 grams TMBDA while stirring continuously. It was then closed, flushed with nitrogen and heated to 110° C. Propylene oxide (6,450 grams) was then fed into the reactor at such a rate as to maintain a maximum pressure of 60 pounds per square inch gauge. The feed required 5 hours to complete, followed by a 7 hour cook-out to insure complete reaction. Toluene and unreacted propylene oxide were then stripped off at 110° C./1–2 mm. Hg. A second addition of 32 grams TMBDA was made and 3,130 grams of propylene then added at 110° C./60 pounds per square inch gauge. Under these conditions, feed time was 2 hours and cook-out 11 hours. Stripping off unreacted propylene oxide resulted in a polyol with an hydroxyl number of 423 and a viscosity of 219 centistokes at 210° F.

Example 26

A pressure reactor was charged with 9,000 grams (60 percent of charge) of toluene, 6,000 grams sugar (6X without starch) and 46 grams of N,N,N′,N′-tetramethylethylenediamine while stirring continuously. It was then closed, flushed with nitrogen and heated to 110° C. Propylene oxide (9,460 grams) was fed at such a rate as to maintain 60 pounds per square inch gauge. The feed required 7 hours and cook-out 4½ hours. After stripping off toluene, a sirupy liquid having a hydroxyl number of 530 and a viscosity of 770 centistokes at 210° F. was obtained.

Example 27

A pressure reactor was charged with 5,150 grams propylene oxide, 6,000 grams sugar (6X without starch), 15 grams TMBDA while stirring continuously. It was then closed, flushed with nitrogen and heated to 100° C. The pressure rose to 101 pounds per square inch gauge maximum and 3,485 additional grams propylene oxide was fed to the reactor over a 3½ hour period. A cook-out of 2½ hours, followed by a stripping to remove any unreacted propylene oxide, produced a polyol with an hydroxyl number of 517 and a viscosity of 690 centistokes at 210° F.

Example 28

Example 27 was repeated except that granulated was substituted for the 6X sugar without starch. When heated to 100° C., the pressure rose to 98 pounds per square inch gauge maximum and 3,485 additional grams propylene oxide was fed over a 3¾ hour period. Cooking out for 4 hours and stripping to remove unreacted propylene oxide completed processing. The resultant polyol had an hydroxyl number of 510 and a viscosity of 614 centistokes at 210° F.

Example 29

Example 27 was repeated except that 45 grams of triethylenediamine replaced the 15 grams TMBDA used in Example 27. When heated to 100° C., pressure rose to 96 pounds per square inch gauge maximum and 3,485 grams additional propylene oxide was fed over a 2¾ hour period. Cooking out for 5½ hours and stripping off unreacted propylene oxide completed processing. The resultant polyol had an hydroxyl number of 534 and a viscosity of 554 centistokes at 210° F.

Example 30

A pressure reactor was charged with 9,000 grams of liquid propylene oxide-sucrose adduct (hydroxyl number of 525), 6,000 grams of sugar (6X without starch) and 15 grams TMBDA. The temperature was raised to 110° C. and 8,715 grams propylene oxide fed over a 4½ hour period while maintaining 60 pounds per square inch gauge. Cooking out for 3 hours and stripping off unreacted propylene oxide produces a polyol with an hydroxyl number of 523 and a viscosity of 701 centistokes at 210° F.

Example 31

Example 30 was repeated except that granulated sugar replaced the 6X sugar used in Example 30. Propylene oxide (8,380 grams) was fed at 110° C./60 pounds per square inch gauge over 3 hours, followed by a 3 hour cook-out. Stripping to remove unreacted propylene oxide completed processing. The resultant polyol had an hydroxyl number of 505 and a viscosity of 611 centistokes at 210° F.

Example 32

Example 30 was repeated except that 15 grams of N,N′-tetramethylethylenediamine replaced TMBDA as the catalyst. Propylene oxide (8,715 grams) was fed at 110° C./60 pounds per square inch gauge over 4 hours, followed by a 3 hour cook-out. Stripping to remove unreacted propylene oxide completed processing The resultant polyol had an hydroxyl number of 521 and a viscosity of 637 centistokes at 210° F.

Example 33

An aqueous sugar solution containing sugar slurried therein and consisting of 1,500 grams of water and 6,000 grams of sugar (6X without starch) was charged to a reactor. After adding 88 grams TMBDA, the reactor was flushed with nitrogen and heated to 70° C. Propylene oxide (4,400 grams) were added at 70° C./30 pounds per square inch gauge, then cooked out, and water and unreacted propylene oxide stripped off. This was done at 80° C./10 mm. Hg to minimize stripping off diols. The remaining propylene oxide, 4,380 grams, was added at 80° C., cooked out and stripped free of unreacted propylene oxide. This polyol had an hydroxyl number of 519 and a viscosity of 400 centistokes at 210° F.

In much the same manner that sucrose was reacted with ethylene and propylene oxide, there may be substituted equivalent quantities of such hydroxylated organic compounds as those illustrated previously and typified by glycerol, pentaerythritol, sorbitol, hydroxylated celluloses, the alkyl glucosides, dextrin, the starches, and the like.

Though the above specifically describe this invention with considerable detail, such is not to be construed as acting to limit the invention except to the extent cited in the claims.

What is claimed is:

1. The process of forming an alkylene oxide adduct of a polyhydroxylated organic compound which comprises intermixing said alkylene oxide with said polyhydroxylated organic compound in the presence of a di-tertiary diamine catalyst.

2. The process of forming an alkylene oxide adduct of a polyhydroxylated organic compound which comprises contacting said alkylene oxide and polyhydroxylated organic compound in the presence of a catalyst having the formula:

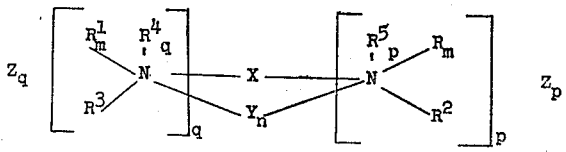

wherein X is a divalent radical selected from the group consisting of alkylene of from about 2 to 10 carbon atoms, arylene containing up to 2 rings, alkylenearylalkyl and arylenealkylaryl; Y is alkylene of from about 2 to about 10 carbon atoms; R, $R^1$, $R^2$, $R^3$, $R^4$ and $R^5$ are each selected from the group consisting of alkyl of from about 1 to about 12 carbon atoms, phenyl, alkylphenyl, wherein the alkyl group has from about 1 to about 12 carbon atoms, and phenylalkyl wherein the alkyl group has from about 1 to about 8 carbon atoms; $n$ is 0 when X is other than alkylene and can be 1 when X is alkylene; $m$ is 0 when $n$ is 1 and $m$ is 1 when $n$ is 0; $q$ and $p$ may each be one of 0 and 1; and Z is a member selected from the group consisting of —OH, halide and carboxylate.

3. The process of forming an alkylene oxide adduct of a polyhydroxylated organic compound which comprises contacting said alkylene oxide and polyhydroxylated organic compound in the presence of a catalyst having the formula:

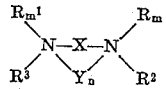

wherein X is a divalent radical selected from the group consisting of alkylene of from about 2 to 10 carbon atoms, arylene containing up to 2 rings, alkylenearylalkyl and arylenealkylaryl; Y is alkylene of from about 2 to about 10 carbon atoms; R, $R^1$, $R^2$ and $R^3$ are each selected from the group consisting of alkyl of from about 1 to about 12 carbon atoms, phenyl, alkylphenyl wherein the alkyl group has from about 1 to about 12 carbon atoms, and phenylalkyl wherein the alkyl group has from about 1 to about 8 carbon atoms; $n$ is 0 when X is other than alkylene and can be 1 when X is alkylene; and $m$ is 0 when $n$ is 1 and $m$ is 1 when $n$ is 0.

4. The process of claim 3 wherein the catalyst is N,N,N',N'-tetramethylbutylenediamine.

5. The process of claim 3 wherein the catalyst is N,N,N',N'-tetramethylethylenediamine.

6. The process of forming an alkylene oxide adduct of sucrose selected from the group consisting of propylene oxide adducts of sucrose and mixed propylene oxide and ethylene oxide adducts of sucrose, which comprises effecting intermixture of an alkylene oxide selected from the group consisting of propylene oxide, ethylene oxide and mixtures thereof with sucrose in a liquid medium and providing in said liquid medium a catalyst characterized by the formula:

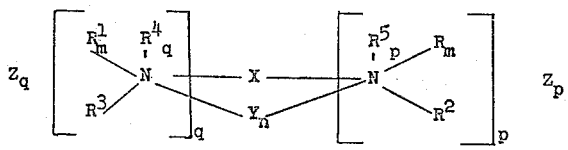

wherein X is divalent radical selected from the group consisting of alkylene of from about 2 to 10 carbon atoms, arylene containing up to 2 rings, alkylenearylalkyl and arylenealkylaryl; Y is alkylene of from about 2 to about 10 carbon atoms; R, $R^1$, $R^2$, $R^3$, $R^4$ and $R^5$ are each selected from the group consisting of alkyl of from about 1 to about 12 carbon atoms, phenyl, alkylphenyl wherein the alkyl group has from about 1 to about 12 carbon atoms, and phenylakyl wherein the alkyl group has from about 1 to about 8 carbon atoms; $n$ is 0 when X is other than alkylene and can be 1 when X is alkylene; $m$ is is 0 when $n$ is 1 and $m$ is 1 when $n$ is 0; $q$ and $p$ may each be one of 0 and 1; and Z is a member selected from the group consisting of —OH, halide and carboxylate.

7. The process of forming an alkylene oxide adduct of sucrose selected from the group consisting of propylene oxide adducts of sucrose and mixed propylene oxide and ethylene oxide adducts of sucrose, which comprises effecting intermixture of an alkylene oxide selected from the group consisting of propylene oxide, ethylene oxide and mixtures thereof with sucrose in a liquid medium and providing in said liquid medium a catalyst characterized by the formula:

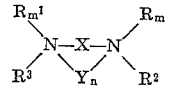

wherein X is a divalent radical selected from the group consisting of alkylene of from about 2 to 10 carbon atoms, arylene containing up to 2 rings, alkylenearylalkyl, and arylenealkylaryl; Y is alkylene of from about 2 to about 10 carbon atoms; R, $R^1$, $R^2$ and $R^3$ are each selected from the group consisting of alkyl of from about 1 to about 12 carbon atoms, phenyl, alkylphenyl wherein the alkyl group has from about 1 to about 12 carbon atoms, phenylalkyl wherein the alkyl group has from about 1 to about 8 carbon atoms; $n$ is 0 when X is other than alkylene and can be 1 when X is alkylene; and $m$ is 0 when $n$ is 1 and $m$ is 1 when $n$ is 0.

8. The process of claim 7 wherein the catalyst is N,N,N',N'-tetramethylbutylenediamine.

9. The process of claim 7 wherein the catalyst is N,N,N',N'-tetramethylethylenediamine.

10. The process of forming an alkylene oxide adduct of sucrose selected from the group consisting of propylene oxide adducts of sucrose and mixed propylene oxide and ethylene oxide adducts of sucrose, which comprises effecting in a liquid medium interreaction of alkylene oxide selected from the group consisting of propylene oxide, ethylene oxide and mixtures thereof and sucrose at a temperature of at least 20° C. below the decomposition temperature of sucrose in the presence of a catalyst characterized by the formula:

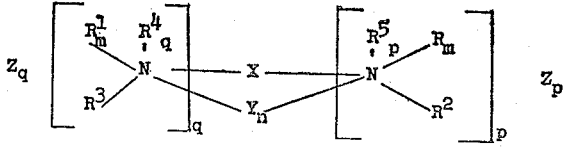

wherein X is a divalent radical selected from the group consisting of alkylene of from about 2 to 10 carbon atoms, arylene containing up to 2 rings, alkylenearylalkyl, and arylenealkylaryl; Y is alkylene of from about 2 to about 10 carbon atoms; R, $R^1$, $R^2$, $R^3$, $R^4$ and $R^5$ are each selected from the group consisting of alkyl of from about 1 to about 12 carbon atoms, phenyl, alkylphenyl wherein the alkyl group has from about 1 to about 12 carbon atoms, and phenylalkyl wherein the alkyl group has from about 1 to about 8 carbon atoms; $n$ is 0 when X is other than alkylene and can be 1 when X is alkylene; $m$ is 0 when $n$ is 1 and $m$ is 1 when $n$ is 0; $q$ and $p$ may each be one of 0 and 1; and Z is a member selected from the group consisting of —OH, halide and carboxylate.

11. The process of forming an alkylene oxide adduct of sucrose selected from the group consisting of propylene oxide adducts of sucrose and mixed propylene oxide and ethylene oxide adducts of sucrose, which comprises effecting in a liquid medium interreaction of alkylene oxide selected from the group consisting of propylene oxide, ethylene oxide and mixtures thereof and sucrose at a temperature of at least 20° C. below the decomposition temperature of sucrose in the presence of a catalyst characterized by the formula:

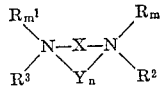

wherein X is a divalent radical selected from the group consisting of alkylene of from about 2 to 10 carbon atoms, arylene containing up to 2 rings, alkylenearylalkyl and arylenealkylaryl; Y is alkylene of from about 2 to about 10 carbon atoms; R, $R^1$, $R^2$ and $R^3$ are each selected from the group consisting of alkyl of from about 1 to about 12 carbon atoms, phenyl, alkylphenyl wherein the alkyl group has from about 1 to about 12 carbon atoms, and phenylalkyl wherein the alkyl group has from about 1 to about 8 carbon atoms; $n$ is 0 when X is other than alkylene and can be 1 when X is alkylene; and $m$ is 0 when $n$ is 1 and $m$ is 1 when $n$ is 0.

12. The process of claim 10 wherein sucrose is suspended in a liquid medium.

13. The process of claim 12 wherein said medium is an inert liquid selected from the group consisting of hydrocarbons, chlorinated hydrocarbons, fluorinated hydrocarbons, and mixtures thereof.

14. The process of claim 12 wherein the liquid medium is a liquid alkylene oxide-sucrose adduct.

15. The process of forming an alkylene oxide adduct of sucrose wherein said alkylene oxide is selected from the group consisting of ethylene oxide, propylene oxide and mixtures thereof, which comprises intermixing said alkylene oxide with an aqueous solution of sucrose to form a liquid alkylene oxide adduct of sucrose, stripping water from said liquid adduct, providing additional sucrose in said liquid adduct, and interreacting additional alkylene oxide with said adduct, said adduct formation occurring in the presence of a catalyst having the formula:

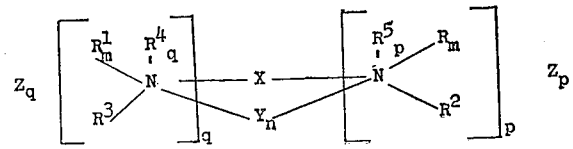

wherein X is a divalent radical selected from the group consisting of alkylene of from about 2 to 10 carbon atoms, arylene containing up to 2 rings, alkylenearylalkyl, and arylenealkylaryl; Y is alkylene of from about 2 to about 10 carbon atoms; R, $R^1$, $R^2$, $R^3$, $R^4$ and $R^5$ are each selected from the group consisting of alkyl of from about 1 to about 12 carbon atoms, phenyl, alkylphenyl wherein the alkyl group has from about 1 to about 12 carbon atoms, and phenylalkyl wherein the alkyl group has from about 1 to 8 carbon atoms; $n$ is 0 when X is other than alkylene and can be 1 when X is alkylene; $m$ is 0 when $n$ is 1 and $m$ is 1 when $n$ is 0; $q$ and $p$ may each be one of 0 and 1; and Z is a member selected from the group consisting of —OH, halide and carboxylate.

16. The process of forming an alkylene oxide adduct of sucrose wherein the alkylene oxide is selected from the group consisting of ethylene oxide, propylene oxide and mixtures thereof, which comprises suspending said sucrose in toluene, reacting said sucrose with said alkylene oxide at a temperature at least 20° C. below the decomposition temperature of sucrose to form a liquid alkylene oxide adduct, removing toluene from said liquid adduct, providing additional solid sucrose suspended in said liquid adduct, and continuing reaction between said additional sucrose and alkylene oxide, said reaction between alkylene oxide and sucrose being effected in the presence of a catalyst characterized by the formula:

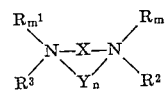

wherein X is a divalent radical selected from the group consisting of alkylene of from about 2 to 10 carbon atoms, arylene containing up to 2 rings, alkylenearylalkyl and arylenealkylaryl; Y is alkylene of from about 2 to about 10 carbon atoms, R, $R^1$, $R^2$ and $R^3$ are each selected from the group consisting of alkyl of from 1 to about 12 carbon atoms, phenyl, alkylphenyl wherein the alkyl group has from about 1 to about 12 carbon atoms, and phenylalkyl wherein the alkyl group has from about 1 to about 8 carbon atoms; $n$ is 0 when X is other than alkylene and can be 1 when X is alkylene; and $m$ is 0 when $n$ is 1 and $m$ is 1 when $n$ is 0.

17. The process of claim 16 wherein the temperature of the reaction is in the range of from about 95° C. to about 120° C.

18. The process of claim 17 wherein the temperature of the reaction is from about 100° C. and about 115° C.

19. The process of claim 12 wherein the liquid medium is alkylene oxide.

References Cited by the Examiner

UNITED STATES PATENTS

| | | | |
|---|---|---|---|
| 2,902,478 | 9/1959 | Anderson | 260—209 |
| 3,085,085 | 4/1963 | Wismer et al. | 260—209 |
| 3,153,002 | 10/1964 | Wismer et al. | 260—209 |
| 3,225,028 | 12/1965 | Nordgren | 260—209 |

LEWIS GOTTS, *Primary Examiner.*

J. R. BROWN, *Assistant Examiner.*